United States Patent [19]
Shinohe

[11] Patent Number: 5,864,098
[45] Date of Patent: Jan. 26, 1999

[54] STYLUS PEN

[75] Inventor: Akihiro Shinohe, Fukushima-ken, Japan

[73] Assignee: Alps Electric Co., Ltd., Japan

[21] Appl. No.: 554,649

[22] Filed: Nov. 8, 1995

[30] Foreign Application Priority Data

Nov. 9, 1994 [JP] Japan .................................. 6-300328

[51] Int. Cl.⁶ .............................. G08C 21/00; G09G 5/00
[52] U.S. Cl. .................................. 178/19.01; 178/19.04; 178/19.05; 345/184
[58] Field of Search .................................. 345/156, 173, 345/179, 181, 182, 184; 178/18.01, 19.01, 19.04, 19.05

[56] References Cited

U.S. PATENT DOCUMENTS

| | | | |
|---|---|---|---|
| 4,639,547 | 1/1987 | Jacob | 178/18 |
| 4,794,634 | 12/1988 | Torihata | 345/182 |
| 4,948,926 | 8/1990 | Murakami | 178/19 |
| 5,294,792 | 3/1994 | Lewis | 345/180 |
| 5,336,006 | 8/1994 | Bador | 401/105 |
| 5,420,379 | 5/1995 | Zank | 178/19 |
| 5,527,126 | 6/1996 | Kolaric | 401/6 |
| 5,528,008 | 6/1996 | Danek | 345/179 |
| 5,548,092 | 8/1996 | Shriver | 178/18 |
| 5,584,592 | 12/1996 | Craig | 401/52 |

*Primary Examiner*—Vijay Shankar
*Attorney, Agent, or Firm*—Brinks Hofer Gilson & Lione

[57] ABSTRACT

A stylus pen wherein coordinate input or menu selection is performed by operating a switch incorporated in the stylus pen. The switch is mounted to a substrate in an opposed relation of a bottom of the switch to an edge portion of the substrate so that an operational direction of an operating portion of the switch and a moving direction of the substrate are substantially coincident with each other. As a cap is pushed, the substrate slides and the operating portion of the switch is pushed by an urging portion of an urging member to actuate the switch.

9 Claims, 11 Drawing Sheets

STYLUS PEN

BACKGROUND OF THE INVENTION

1. Field of the Invention

The present invention relates to a stylus pen to be used mainly for a tablet or the like. More particularly, the present invention is concerned with a stylus pen to be used for an electrostatic coupling type tablet and suitable for performing coordinate input and menu selection.

2. Prior Art

A prior art stylus pen of this type will be described below with reference to FIGS. 26 through 28.

FIGS. 26 and 27 illustrate a conventional stylus pen, which stylus pen, indicated at 11, generally comprises a first case 12, circuit portion 13, cap 16, holder member 18, spring 19 and second case 20.

As shown in FIGS. 26 and 27, the first case 12, which is an elongated case formed of an insulating material such as ABS resin for example, has a peripheral portion 12a and a semicircular side wall 12b provided at one end of the peripheral portion 12a. The peripheral portion 12a, having semi-arcuate inner and outer peripheral surfaces, is formed so as to become smaller in diameter from one end side thereof where the side wall 12b is positioned toward the opposite side, namely the other end side. In the other end of the peripheral portion 12a is formed a receptacle part 12c for a cap 16 which will be described later, while on the inner peripheral surface of the peripheral portion 12a is formed a receiving part 12d for a substrate 14 which will be described later. Further, a cutout 12e for fitting therein one end of a later-described spring 19 is formed in the side wall 12b.

The circuit portion 13 comprises a substrate 14 formed of such material as paper or a phenolic resin, a push-button switch 15 provided with an operating part 15a and a terminal part 15b, and a detector 17 constituted by a conductor piece for detecting the position of the stylus pen 11 on a tablet 22. The switch 15 is turned on and off by pushing the operating part 15a, and its terminal part 15b is soldered to one side of the rear end of the substrate 14, namely the right end upper surface of the substrate in FIG. 27. On the other hand, to the front end of the substrate 14, namely the left end of the substrate in FIG. 27, is mounted the detector 17 also by soldering and is covered with a cap 16 formed of a synthetic resin material. On the upper surface of the substrate 14, though not shown, is formed an electronic circuit for processing a signal detected by the detector 17. The electronic circuit is connected electrically to both terminal part 15b of the switch 15 and detector 17, and there is provided a cable (not shown) which is connected to the said electronic circuit.

The cap 16 is put on the receptacle part 12c of the first case 12 and longitudinal edges of the substrate 14 are put on the receiving part 12d of the first case 12, whereby the circuit portion 13 is accommodated within the first case. Though not shown, the cable connected to the electronic circuit on the substrate is drawn out of the first case 12 through a through hole formed in the peripheral portion 12a of the first case.

A cylindrical holder member 18 formed of a synthetic resin material such as polyacetal has a cylindrical peripheral portion 18a and an end face portion 18b. The open side of the peripheral portion 18a is formed with a pair of cutouts 18c extending through the peripheral portion toward the inner part to thereby form a flexible part 18d as shown in FIGS. 26 and 27. The inside and outside walls of the flexible part 18d are provided with protuberances 18e and 18f, respectively. Further, in the inner wall of the peripheral portion 18a are formed a pair of slots 18g which are opposed to each other with 180° phase shift.

Both longitudinal edges at the rear end of the substrate 14 are fitted in the paired inner slots 18d to receive and hold the substrate rear end. In this state, the protuberance 18e of the flexible part 18d is in abutment with the operating part 15a of the switch 15.

The holder member 18 is accommodated slidably within the first case 12 in an abutted state of part of its peripheral portion 18a with the inner peripheral surface of the first case.

As shown in FIG. 27, one end of the spring 19, which is formed of a metallic material, is fitted in the cutout 12e formed in the side wall 12b and is thereby mounted within the first case 12, while the opposite end thereof is brought into abutment with the end face portion 18b of the holder member 18 and is thereby accommodated within the case 12.

The second case 20, which is an elongated case formed of an insulating material such as ABS resin for example, is provided with a peripheral portion 20a having arcuate inner and outer peripheral surfaces and is also provided with a semicircular side wall 20b formed at one end of the peripheral portion 20a, as shown in FIGS. 26 and 27. As is the case with the first case 12, the peripheral portion 20a is formed so as become smaller in diameter gradually from its one end side where the side wall 20b is positioned toward the opposite side, namely the other end side. In the other end of the peripheral portion 20a is formed a receptacle part 20c for the cap 16. On the inner peripheral surface of the peripheral portion 20a are provided a protuberance 20d and a receiving part 20e for the substrate 14. Further, in the side wall 20b is formed a cutout 20f for fitting therein of one end of the spring 19.

As shown in FIG. 27, the second case 20 is mounted to the first case 12 with an adhesive or the like. When the first and second cases 12, 20 are thus combined together, the holder member 18 and the spring 19 are accommodated within both cases, one end of the spring 19 which has been fitted in the cutout 12e of the first case 12 is also fitted in the cutout 20f, the receptacle part 20c is in abutment with the peripheral surface of the cap 16 and holds the cap 16 slidably in cooperation with the receptacle part 12c of the first case, and the receiving part 20e is in abutment with the longitudinal edges of the substrate 14 and holds the substrate also slidably in cooperation with the receiving part 12d of the first case. Further, the detector 17 is positioned near the center between the inner walls of the first and second cases 12, 20 to detect the position of the stylus pen 11 on the tablet 22.

How to assemble the stylus pen 11 will now be described. First, the terminal part 15b of the switch 15 and electronic components (not shown) are mounted by soldering onto the substrate 14. Next, the detector 17 is mounted by soldering to the front end of the substrate 14, then the cap 16 is mounted and then, though not shown, a cable is connected to the electronic circuit of the substrate 14 to assemble the circuit portion 13. Next, the rear end of the substrate 14 is fitted in the paired slots 18g of the holder member 18 and is thereby accommodated within the holder member to render the substrate and the holder member 18 integral with each other. Then, one end of the spring 19 is fitted and mounted in the cutout 12e formed in the side wall 12b of the first case 12, and the cable connected to the electronic circuit of the substrate 14 is drawn out of the first case 12 through a through hole formed in the peripheral portion 12a of the first case. Thereafter, the cap 16 is put on the receptacle part 12c of the first case 12 and the longitudinal edges of the substrate 14 are put on the receiving part 12c of the first case to accommodate the circuit portion 13 within the first case 12.

Subsequently, the one end of the spring 19 which has been fitted in the cutout 12e of the first case 12 is also fitted in the cutout 20f formed in the second case 20. Further, the receptacle part 20c of the second case is brought into abutment with the peripheral surface of the cap 16 and the receiving part 20e of the second case is abutted with the longitudinal edges of the substrate 14, thus allowing the second case 20 to be put on the first case 12. In this state both are bonded together.

In this way the assembly of the stylus pen 11 is completed. After the assembly, the opposite end of the spring 19 is in abutment with the end face portion 18b of the holder member 18.

The operation of the stylus pen 11 will now be described. In the stylus pen 11, as shown in FIG. 28, the cable drawn out from the through hole formed in the peripheral portion 12a of the first case 12 is connected to the tablet 22 of the electrostatic coupling type, which tablet is connected to a body 23 of a computer, an electronic game machine, or the like. In the portion near the surface of the tablet 22 are buried a plurality of signal lines in the form of a lattice and at predetermined intervals in both X and Y axis directions. A control means (not shown) which is provided within the tablet 22 makes control so as to pass an alternating current successively in a switched manner for each of the said signal lines. The signal lines are each coupled electrostatically with the detector 17, and a maximum detection output is obtained from the detector 17 when an alternating current is passed through the signal line closest to the detector 17. Thus, the control means detects the position of the stylus pen 11 on the tablet 22 by determining to which signal line an alternating current was flowed when the detector 17 produced the maximum output. This detection of the position is performed time-division wise in an alternate manner in X and Y axis directions. An input operation using the tablet 22 is performed by gripping the stylus pen 11 and pressing the cap 16 to a desired position on the tablet. As a result, the cap 16 is pushed into the first and second cases 12, 20, and the substrate 14 engaged with the cap 16, as well as the holder member 18 fitted on the substrate 14, slide within the first and second cases while compressing the spring 19, so that the protuberance 18f formed on the flexible part 18d of the holder member 18 come into abutment with the protuberance 20d of the second case 20. Upon further pressing of the cap 16 in this state, the protuberance 18f is pushed in by the protuberance 20d, resulting in that the flexible part 18d bends inwards by virtue of its elasticity and the protuberance 18e of the flexible part 18d pushes the operating part 15a of the switch 15, whereby the switch 15 is kept on and this information is transmitted to the tablet 22. As the stylus pen 11 is moved on the tablet 22 in this state, the position of the stylus pen on the tablet is detected on the basis of an output signal provided from the detector 17 in accordance with the foregoing principle, and signals responsive to movements of the stylus pen 11 are provided from the tablet 22 to the body 23, whereby the cursor on a display (not shown) of the body 23 moves to draw, for example, graphics on the display.

The inputting operation for graphics or the like can be stopped by moving the cap 16 away from the upper surface of the tablet 22, whereupon the holder member 18 slides under the restoring force of the compressed spring 19, the protuberance 18f of the flexible part 18d goes away from the protuberance 20d of the second case 20, the flexible part 18d reverts to its original state, and the operating part 15a of the switch 15 is no longer pushed by the protuberance 18e of the flexible part 18d, so that the switch 15 turns off and the resulting signal is transmitted to the body 23 through the tablet 22.

According to the conventional stylus pen structure described above, upon release of the cap 16 from the upper surface of the tablet 22, the holder member 18 slides under the restoring force of the compressed spring 19 and the protuberance 18f of the flexible part 18d leaves the protuberance 20d of the second case 20. However, there has been a fear of occurrence of the following inconvenience. As a result of repetition of such inputting operation, both protuberances 18f and 20d rub each other to roughen the sliding surface, the frictional force between the protuberances 18f and 20d becomes larger than the restoring force of the spring 19, the holder member 18 becomes immovable with the protuberance 18f pushed in by the protuberance 20d, and hence the switch 15 cannot be turned off.

Besides, the switch 15 is mounted on one side of the substrate 14 and it is necessary to use the holder member 18 provided with a cam mechanism for converting the moving direction of the substrate 14 into an operational direction of the operating part 15a of the switch 15 to press the operating part 15a. Therefore, it is required to ensure within the stylus pen 11 a space for all of the size of switch 15, the thickness of the substrate 14 and both protuberances 18f, 20d, with the result that the diameter of the stylus pen 11 increases and the stylus pen is compelled to become larger in size.

Moreover, since the first case 12 and the holder member 18 are in face contact with each other, a high frictional force is created at the time of sliding motion of the holding member 18 and there arise large variations in such force. Therefore, the operator is required to operate the stylus pen 11 with a force greater than the said frictional force, resulting in that the force required to operate the switch 15 and applied to the pen point, namely the cap 16, also fluctuates and thus it is difficult to keep constant the quality required for the stylus pen.

Further, the detection performance of the detector 17 depends on the state of mounting of the detector and in this connection the soldering work for mounting the detector to the substrate 14 is a minute manual operation and is troublesome. Thus, an increase of product cost results.

SUMMARY OF THE INVENTION

The present invention has been accomplished in view of the above-mentioned problems and it is the object of the invention to provide a stylus pen of good operability capable of effecting switch on/off operation with certainty and attaining the reduction of size.

According to a first means adopted in the present invention, since the switch operating direction and the substrate moving direction are approximately the same, it is not necessary to use any means for conversion of both directions and hence the switch mounted to edges of the substrate can be surely turned on and off. Besides, the substrate can be accommodated in the case diameter direction within the space occupied by the switch and it is not necessary to ensure a space corresponding to the substrate thickness in the case diameter direction, thus permitting reduction of the case diameter.

In the first means, moreover, edge portions of the substrate are opposed to the middle of the switch bottom portion, so it is possible to set the distance between the case inner wall and both sides of the substrate almost equal, in other words, it is possible to position the switch nearly centrally in the case, thus permitting further reduction of the case diameter.

According to the first means, a detector for detecting a signal provided from a tablet is formed by printing on the substrate, whereby it is possible to save the time and labor for mounting the detector to the substrate. Consequently, not only the reduction of product cost can be attained but also it is possible to form the detector always in the same state on the substrate.

According to a second means adopted by the present invention, since the substrate can be accommodated within the space occupied by the switch in the case diameter direction and it is not necessary to ensure a space corresponding to the thickness of the substrate in the case diameter direction, it is possible to reduce the case diameter. Besides, since the switch and an urging member are opposed to each other so as to attain approximate coincidence between the operating direction of the switch and the moving direction of the urging member, the urging force induced with movement of the urging member is transmitted to the switch without changing its direction to the switch operating direction, thereby ensuring on/off operation of the switch.

According to the construction of a third means adopted by the present invention, a retaining member superior in slidability to the substrate slides on projections and come into partial contact with the projections, so it is possible to diminish the frictional force induced with the sliding motion of the retaining member, thereby permitting the substrate to slide smoothly within the case to actuate the switch.

DESCRIPTION OF THE PREFERRED EMBODIMENTS

A stylus pen according to the first embodiment of the present invention, which is used for an electrostatic coupling type tablet, will be described hereinunder with reference to FIGS. 1 through 23.

Figure 20:
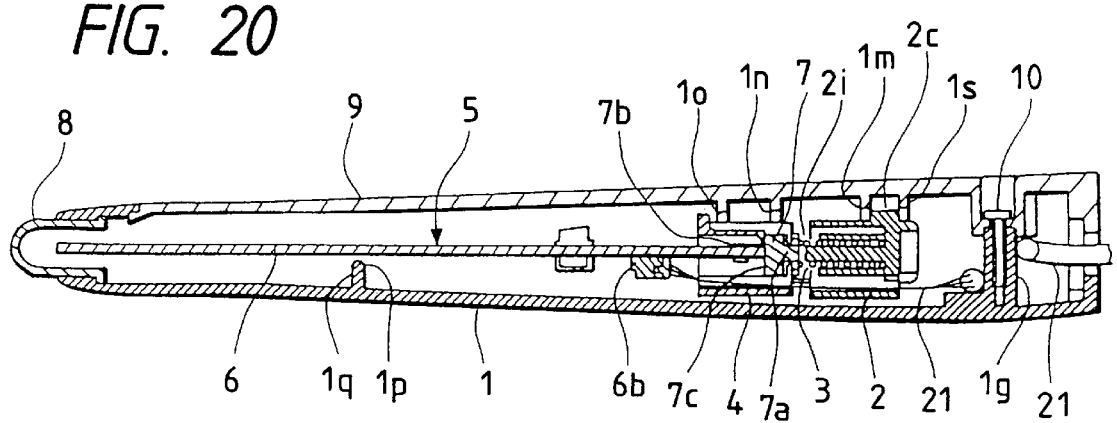
FIG. 20 is a longitudinal sectional view of the stylus pen of the first embodiment.

As shown in FIG. 20, the stylus pen according to the first embodiment of the present invention substantially comprises a first case 1, urging member 2, spring 3, retaining member 4, circuit portion 5, cap 8, second case 9, screw 10 and cable 21.

The first case 1, which is an elongated case formed of an insulating, synthetic resin material such as ABS resin, as shown in FIGS. 1 to 7, is provided with a peripheral portion 1a having semi-arcuate inner and outer peripheral surfaces, a cylindrical portion 1b formed at one end of the peripheral portion 1a, and a semicircular side wall 1c formed at the opposite end of the peripheral portion 1a.

Figure 1:
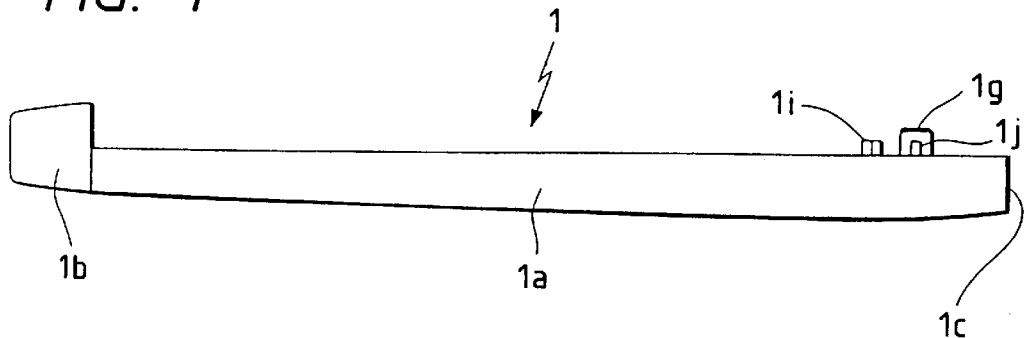
FIG. 1 is a front view of a first case used in a stylus pen according to the first embodiment of the present invention.
Figure 2:
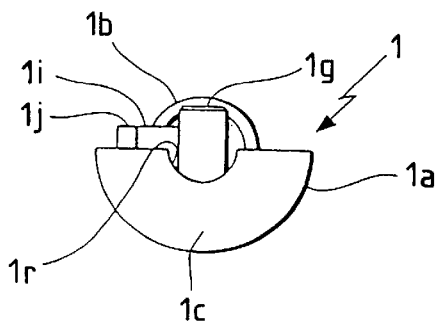
FIG. 2 is a right side view of the first case shown in FIG. 1.
Figure 3:
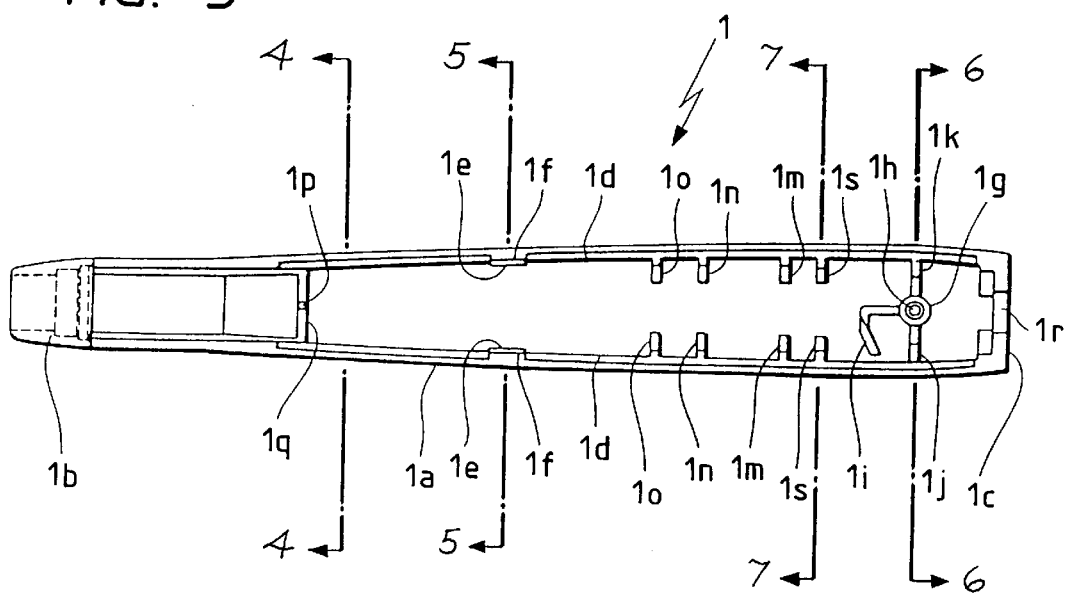
FIG. 3 is a plan view of the first case shown in FIG. 1.
Figure 4:
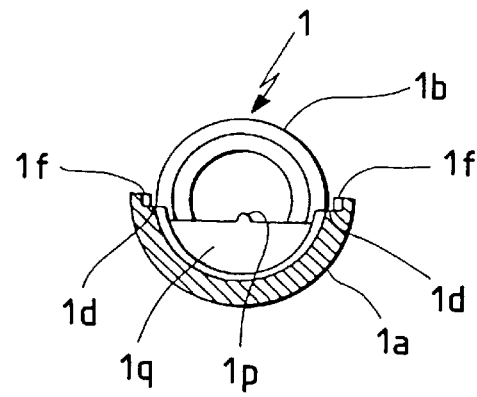
FIG. 4 is a sectional view of the first case taken along line 4—4 in FIG. 3 and viewed from the opposite end side.
Figure 5:
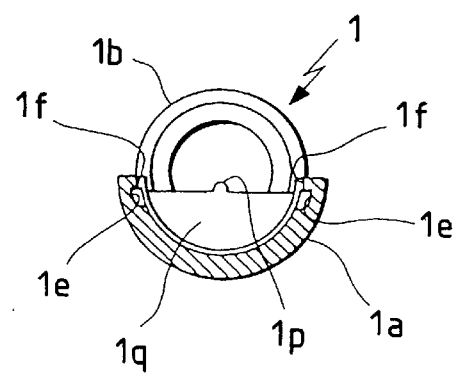
FIG. 5 is a sectional view of the first case taken along line 5—5 in FIG. 3 and viewed from the opposite end side.

The semicircular side wall 1c is centrally formed with a concentric, semicircular cutout 1r, and the peripheral portion 1a is formed so as to gradually become smaller in diameter from its end (the opposite end) where the side wall 1c is formed toward its end (one end) where the cylindrical portion 1b is formed. Such a pair of stepped portions 1d as shown in FIG. 4 are formed longitudinally in the inner peripheral surface of the peripheral portion 1a. The stepped portions 1d such a pair of cutouts 1e as shown in FIG. 5 in positions corresponding to the longitudinal center of the peripheral portion 1a. Above the cutouts 1e in FIG. 5 are formed a pair of lugs 1f projecting radially toward the center.

Figure 6:
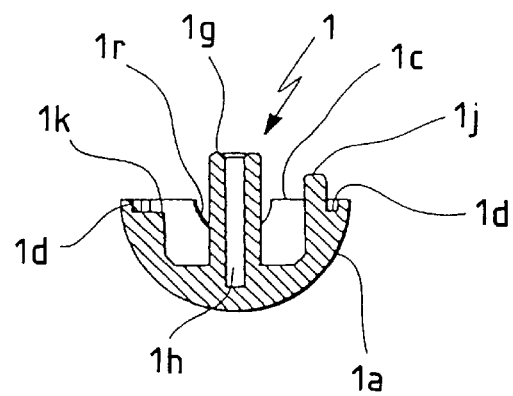
FIG. 6 is a sectional view of the first case taken along line 6—6 in FIG. 3 and viewed from one end side.

On the inner peripheral surface of the peripheral portion 1a is erected a columnar portion 1g on the side wall 1c side, and a bolt slot 1h is formed centrally in the columnar portion 1g and in parallel with the axis of the columnar portion, as shown in FIG. 6. On the cylindrical portion 1b side of the columnar portion 1g there is provided a projection 1i which is connected with the columnar portion, and such projections 1j and 1k as shown in FIG. 6, which are connected with the columnar portion 1g, are formed on the inner peripheral surface of the peripheral portion 1a in positions corresponding to both transverse sides of the columnar portion 1g.

Figure 7:
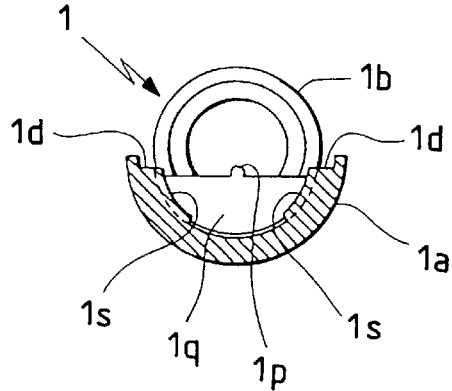
FIG. 7 is a sectional view of the first case taken along line 7—7 in FIG. 3 and viewed from the opposite end side.

Further, on the inner peripheral surface of the peripheral portion 1a there are formed such a pair of projections 1s of an arcuate section as shown in FIG. 7 on the cylindrical portion 1b side of the projection 1i, and on the cylindrical portion 1b side of the paired projections 1s are formed three pairs of projections 1m, 1n and 1o which are the same as the paired projections 1s and which are positioned at predetermined intervals.

On the inner peripheral surface of the peripheral portion 1a, moreover, there is formed such a guide wall 1q having a semi-spherical protuberance 1p as shown in FIG. 5 in a position near the middle between the cylindrical portion 1b and the lugs 1f.

Figure 8:
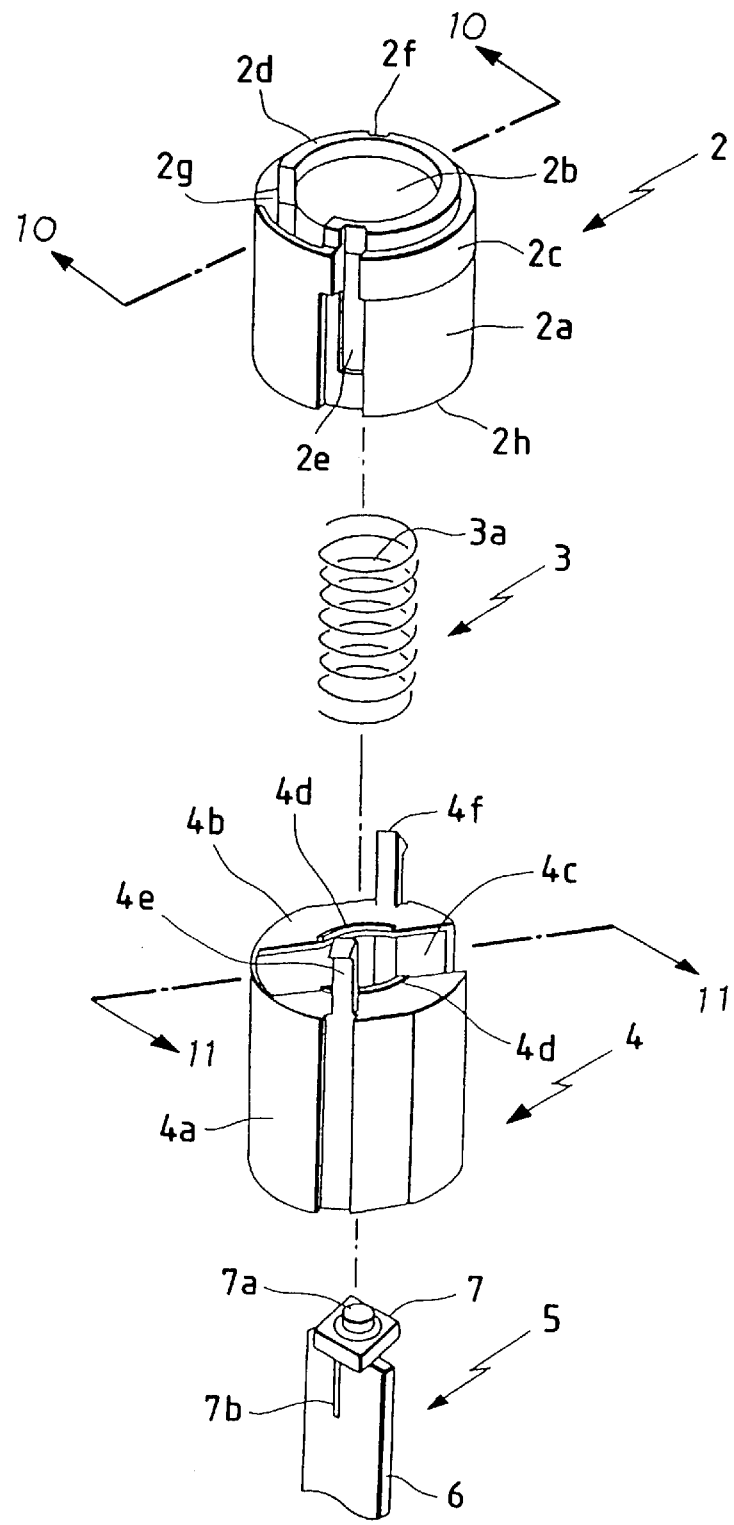
FIG. 8 is an exploded perspective view of main constituent members contained in the first and second cases used in the stylus pen of the first embodiment.

The urging member 2, which is generally cylindrical and is formed of a synthetic resin material such as ABS resin, has a cylindrical peripheral portion 2a and an end face portion 2b. As shown in FIG. 8, the peripheral portion 2a is provided with an annular projection 2c and the end face portion 2b is provided with an annular projection 2d. Moreover, cutouts 2e and 2f extending through the interior of the urging member 2 are formed in the peripheral portion 2a in positions which are 180° out of phase with each other. Further, in a position between the cutouts 2e and 2f is formed a cutout 2g extending also through the interior of the urging member 2.

Figure 9:
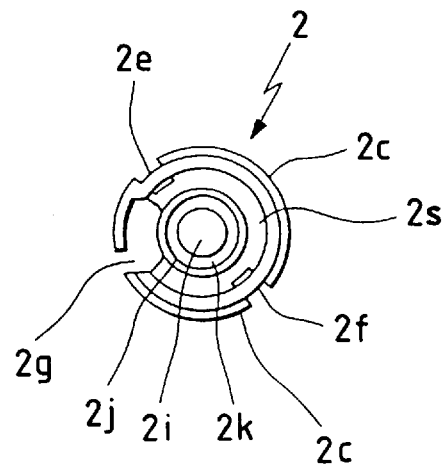
FIG. 9 is a bottom view of an urging member shown in FIG. 8.
Figure 10:
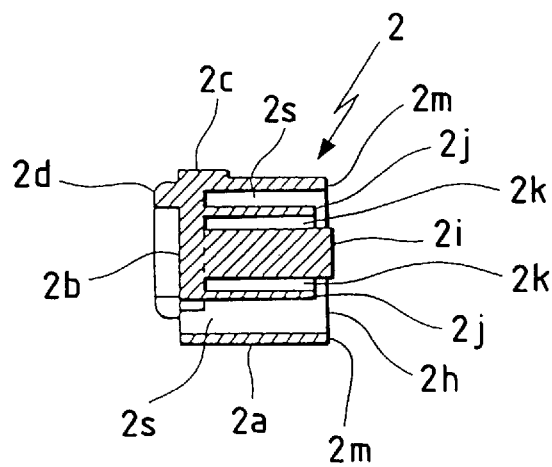
FIG. 10 is a longitudinal sectional view of the urging member taken along line 10—10 in FIG. 8.

On the side (the lower side in FIG. 8) opposed to the end face portion 2b of the urging member 2 there is provided an opening 2h, and in the interior of the urging member 2 the inner wall of the end face portion 2b is centrally provided with a columnar urging portion 2i so that the extending end part of the urging portion projects from the opening 2h, as shown in FIGS. 9 and 10. By providing an annular projection 2j around the urging portion 2i there is formed an annular space 2k between the urging portion 2i and the annular projection 2j, and an annular space 2s is formed between the annular projection 2j and the inner wall of the peripheral portion 2a. The external form of the urging portion 2i and the annular projections 2c, 2j are in a concentric shape in plan view.

Figure 19:
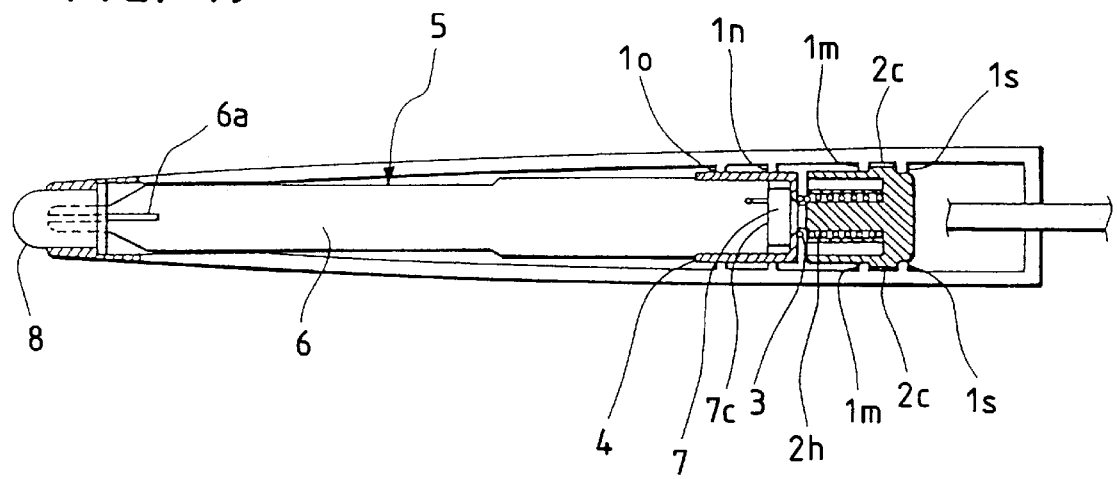
FIG. 19 is a partially sectional plan view of urging member, spring, retaining member, circuit portion and cap as mounted within the first case used in the stylus pen of the first embodiment.

When the urging member 2 is received in the first case 1, as shown in FIG. 19, the annular projection 2c of the urging member 2 is positioned between the paired projections 1s and 1m of the first case and its movement is therefore restricted in the longitudinal direction of the first case.

AS shown in FIG. 8, the spring 3 of a spiral shape formed of a metallic spring material has a centrally formed, cylindrical space portion 3a and, as shown in FIG. 19, the urging portion 2i of the urging member 2 is positioned within the cylindrical space portion 3a, whereby the spring 3 is in an accommodated state within the annular space 2k of the urging member 2.

Figure 11:
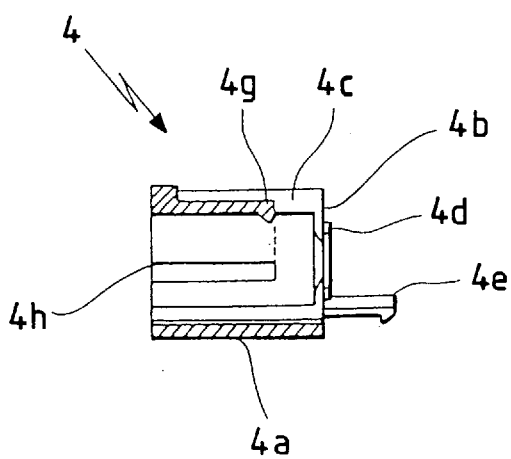
FIG. 11 is a longitudinal sectional view of a retaining member taken along line 11—11 in FIG. 8.
Figure 12:
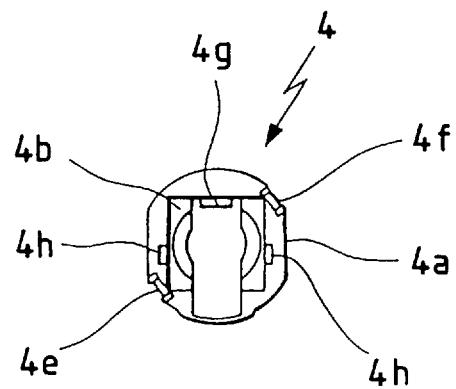
FIG. 12 is a bottom view of the retaining member shown in FIG. 8.

As shown in FIG. 8, the retaining member 4 of a cylindrical shape formed of a synthetic resin material such as polyacetal superior in sliding performance to paper phenol resin and ABS resin, has a generally cylindrical peripheral portion 4a and an end face portion 4b, and a cutout 4c is formed from the end face portion 4b to the peripheral portion 4a so as to extend through the interior. On the end face portion 4b are formed a pair of arcuate projections 4d on the same circumference and on both sides of the cutout 4c. Further, hooks 4e and 4f each having an engaging pawl at the tip thereof are projecting from the end face portions 4b so as to be 180° out of phase with each other. In the cutout 4c of the peripheral portion 4a is provided a projection 4g of hook-shaped in cross section, as shown in FIG. 11, and in the inner wall of the peripheral portion 4a are formed a pair of guide grooves 4h up to the same position as the tip of the projection 4g in FIG. 11, as shown in FIG. 11.

Figure 13:
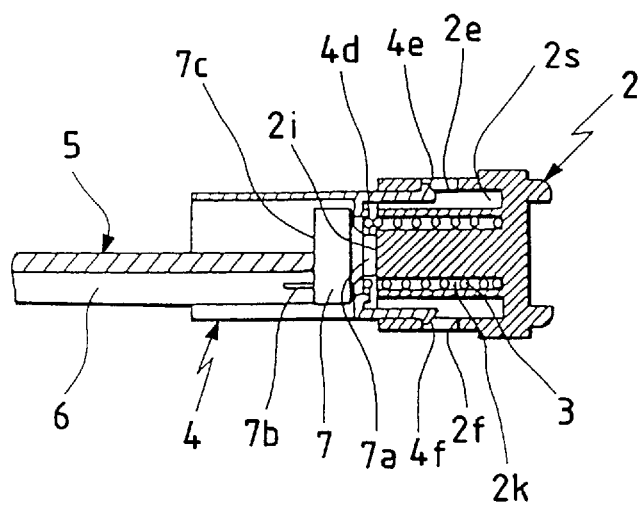
FIG. 13 is an enlarged sectional view of a principal portion as a combination of urging member, spring, retaining member and circuit portion which are shown in FIG. 8.
Figure 14:
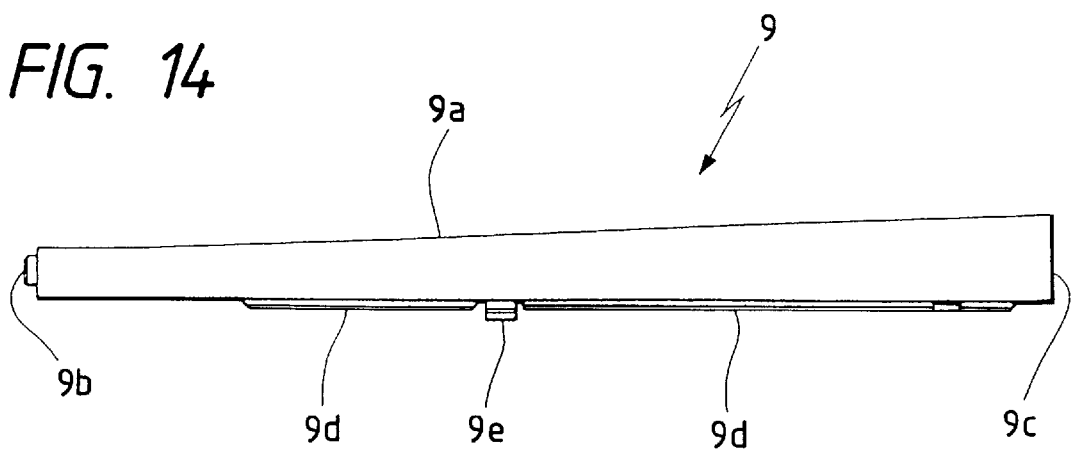
FIG. 14 is a front view of a second case used in the stylus pen of the first embodiment.
Figure 15:
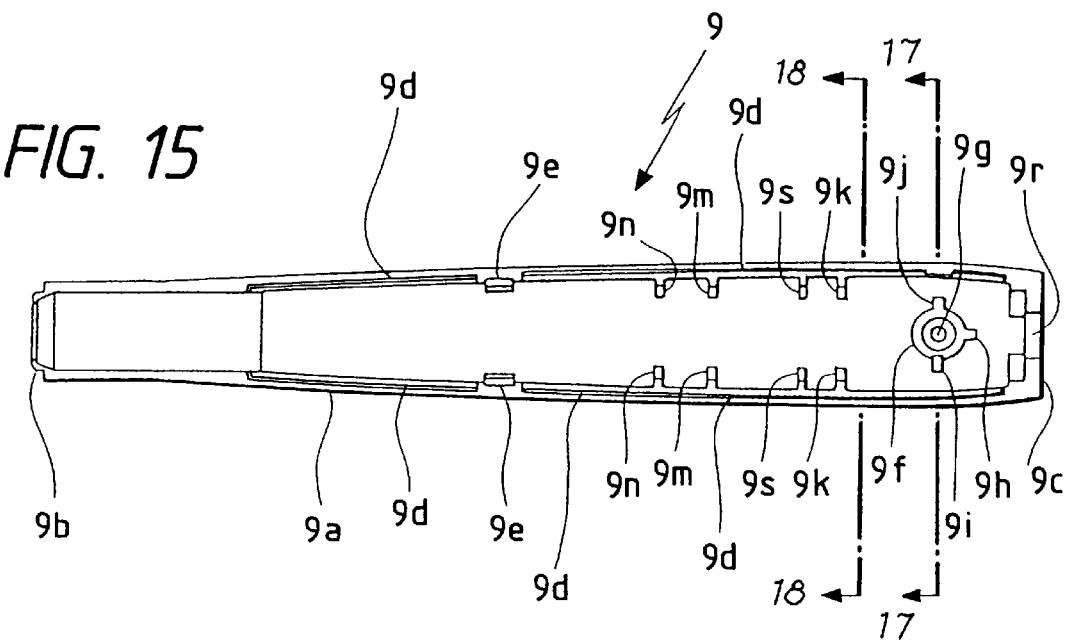
FIG. 15 is an inside bottom view of the second case shown in FIG. 14.

The hooks 4e and 4f of the retaining member 4 are opposed to the cutouts 2e and 2f of the urging member 2 and are brought into engagement with those cutouts 2e and 2f, respectively, by virtue of their elasticity. In this mounted state of the hooks 4e and 4f, one end of the spring 3 is positioned between the paired arcuate projections 4d and is in abutment with the end face portion 4b, whereby the spring is held between the annular space 2k of the urging member 2 and the projections 4d of the retaining member 4d. When the retaining member 4 is received within the first case 1, it is put on the paired projections 1n and 1o of the first case, and in this state, if a force acting in the direction of the urging member 2, namely a rightward force in FIGS. 13 and 20, is applied to the retaining member 4, the hooks 4e and 4f of the retaining member are guided along the cutouts 2e and 2f of the urging member 2 while the peripheral portion 4a of the retaining member is brought into sliding contact with the paired projections 1n and 1o, and the retaining member 4 moves smoothly toward the urging member 2 while compressing the spring 3 because the retaining member is constructed of a synthetic resin material superior in sliding performance. When the application of the force toward the urging member 2 is stopped, the retaining member 4 moves back to its original position smoothly by virtue of the restoring force of the spring 3. At this time, the hooks 4e and 4f are kept engaged with the cutouts 2e and 2f of the urging member 2 because their tips have engaging pawls.

Figure 21:
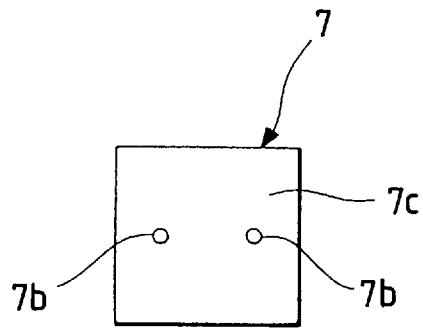
FIG. 21 is a bottom view of a push-button switch used in the stylus pen of the first embodiment.
Figure 22:
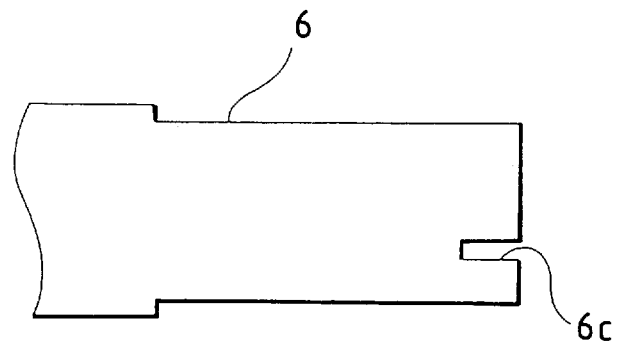
FIG. 22 is an enlarged plan view of a principal portion of a substrate used in the stylus pen of the first embodiment.
Figure 23:
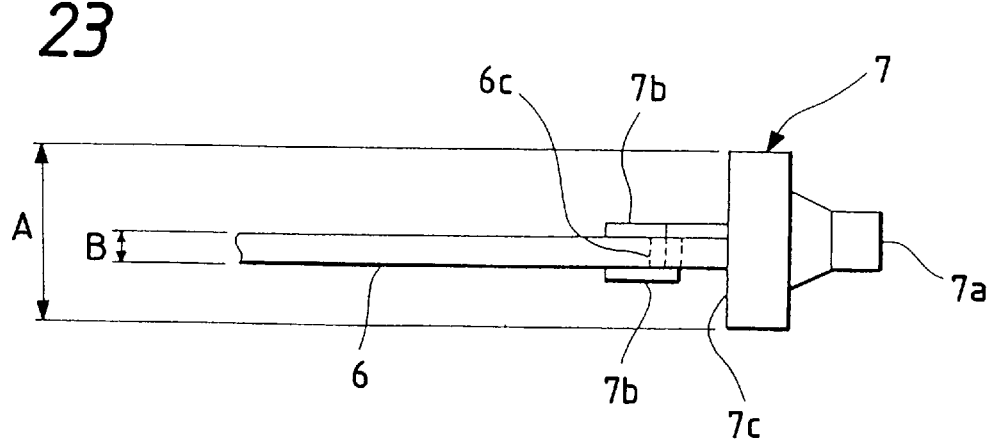
FIG. 23 is a side view of a principal portion of the circuit portion shown in FIG. 8.

As shown in FIG. 20, the circuit portion 5 comprises a substrate 6 which is a printed circuit board generally rectangular in plan and formed of such a material as paper phenol resin, and a push-button switch 7 which is provided with an operating part 7a and two terminal parts 7b. On both sides of the substrate 6 are mounted electronic components (not shown), and in the rear end portion of the substrate is formed such a cutout 6c as shown in FIG. 22 for escape of the terminal parts 7b. The switch 7 is adapted to turn on by pushing the operating part 7a and turn off upon release of the pushing operation. The two terminal parts 7b are arranged in parallel centrally on a bottom 7c of the switch 7, as shown in FIG. 21. In the switch 7, as shown in FIG. 23, a middle portion of the bottom 7c is made opposed and adjacent to an edge portion of the substrate 6 (preferably both are brought into abutment with each other), and one terminal part 7b is soldered to one side of the substrate 6, while the other terminal part 7b is bent and soldered to the other side of the substrate 6 through the cutout 6c of the substrate. Thus, the switch 7 is mounted to the rear end portion of the substrate 6 in a sandwiched state of the substrate between the terminal parts 7b. The substrate 6 is positioned within the width A, of the switch 7, and the pushing operation direction of the switch 7 and the longitudinal direction of the substrate 6 are nearly parallel to each other. Further, most of electronic components (not shown) mounted on the substrate 6 are positioned within the width A, of the switch 7.

As shown in FIG. 19, a detector 6a, which is a copper foil pattern, is formed by printing on a tapered front end portion of the substrate 6, and a cap 8 formed of a synthetic resin material superior in sliding performance such as polyacetal is fitted thereon. As shown in FIG. 20, moreover, a connector 6b is mounted to the other side of the substrate 6 by soldering for example. Further, though not shown, soldering lands for mounting and soldering electronic components as constituents of an electronic circuit for processing signals detected by the detector 6a, as well as wiring patterns for the connection of electronic components, are formed by printing on both sides of the substrate 6 simultaneously with the detector 6a. The electronic components, detector 6a, connector 6b and terminal parts 7b of the switch 7 are connected electrically by the above wiring patterns to constitute the electronic circuit. A resist layer is printed on the detector 6a and on unsoldered wiring patterns to cover the copper foil pattern. The substrate 6 is inserted into the retaining member 4 while being fitted in the guide grooves 4h of the retaining member and the switch 7 is retained by the projection 4g, whereby the substrate 6 is mounted integrally so as not to become dislodged from the retaining member 4. At this time, the operating part 7a of the switch 7 is positioned between the paired arcuate projections 4d of the retaining member 4 and is in opposition to the urging portion 2i of the urging member 2, so that when a force acting in the urging member direction, namely a rightward force in FIG. 13, is exerted on the substrate 6, the substrate moves toward the urging member 2 while compressing the spring 3 integrally with the retaining member 4. When this sliding motion has reached a predetermined distance, the operating part 7a of the switch 7 is pushed by the urging portion 2i of the urging member 2, whereby the switch 7 is turned on. In this case, the end face portion 4b of the retaining member 4 comes into abutment with an edge of the peripheral portion 2a of the urging member 2 to stop the movement of the substrate 6 so that the operating part 7a of the switch 7 may not be pushed with a stronger force than necessary. When the application of the force acting in the direction of the urging member 2 is stopped, the retaining member 4, switch 7, substrate 6 and cap 8 revert to their original states by virtue of the restoring force of the spring 3, and the switch 7 is turned off. To the connector 6b of the substrate 6 is connected a cable 21 as shown in FIG. 20 though the details of its connection structure are here omitted. The cable 21 is drawn out from the cutout 4c through the interior of the retaining member 4 and is further drawn out of the cutout 2g from the opening 2h of the urging member 2 through the interior of the urging member.

As shown in FIG. 19, the circuit portion 5 is received into the first case 1 in such a manner that the front end of the cap 8 is projecting from the cylindrical portion 1b of the first case 1 to the exterior of the first case. Further, as shown in FIG. 20, the switch 7 side of the substrate 6 is supported by the retaining member 4, and the circuit portion 5 is accommodated in the first case 1 in such a dimensional relation that the protuberance 1p formed on the guide wall 1q of the first case is in abutment with or slightly spaced from the other side of the substrate 6. Thus, by being rendered integral with the retaining member 4, the substrate 6 can be accommodated easily into the first case 1. Even in the event of abutment of the protuberance 1p with the other side of the substrate 6 during the sliding motion of the substrate, the substrate can slide smoothly without creating friction because the protuberance 1p is semi-spherical. The cable 21 drawn out from the cutout 2g of the urging member 2 goes around the columnar portion 1g while being guided by the projections 1i, 1j and 1k of the first case 1 and is drawn out of the first case through the cutout 1r of the side wall 1c.

The second case 9, which is an elongated case formed of the same insulating, synthetic resin material as that of the first case 1, e.g. ABS resin, comprises a peripheral portion 9a having inner and outer arcuate peripheral surfaces, an engaging portion 9b formed at one end of the peripheral portion 9a and having diameter smaller than that of the peripheral portion, and a semicircular side wall 9c formed at the opposite end of the peripheral portion 9a.

Figure 16:
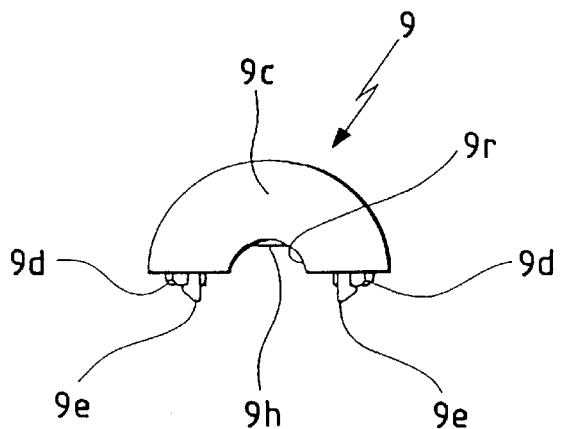
FIG. 16 is a right side view of the second case shown in FIG. 14.

In the semicircular side wall 9c is centrally formed a cutout 9r which is concentric and semicircular. The peripheral portion 9a is formed so as to become smaller in diameter gradually from the opposite end side where the side wall 9c is formed toward the one end side where the engaging portion 9b is formed. A pair of projections 9d which are partially cut out are formed longitudinally on both edges of the peripheral portion 9a. Further, hook- like projections 9e each having an engaging pawl at the tip thereof, as shown in FIG. 16, is formed on the inner peripheral surface of the peripheral portion 9a in positions corresponding to the cutout portions of the projections 9d.

Figure 17:
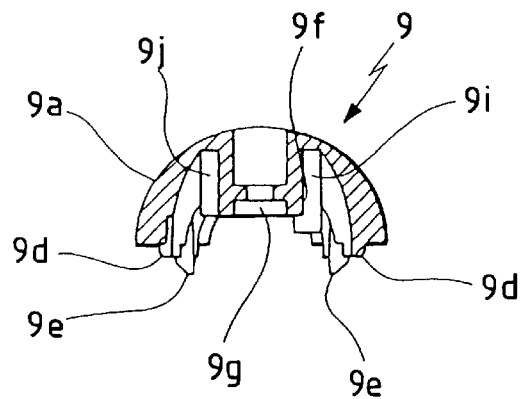
FIG. 17 is a sectional view of the second case taken along line 17—17 in FIG. 15 and viewed from the opposite end side.

On the inner peripheral surface of the peripheral portion 9a is formed a columnar portion 9f on the side wall 9c side, and centrally of the columnar portion 9f is formed a bolt hole 9g extending in parallel with the axis of the columnar portion and having a stepped portion, as shown in FIG. 17. On the side wall 9c side of the columnar portion 9f is formed a projection 9h which is connected with the columnar portion, and on the inner peripheral surface of the peripheral portion 9a and on both sides in the transverse direction of the columnar portion 9f are formed projections 9i and 9j which are connected with the columnar portion 9f, as shown in FIG. 17.

Figure 18:
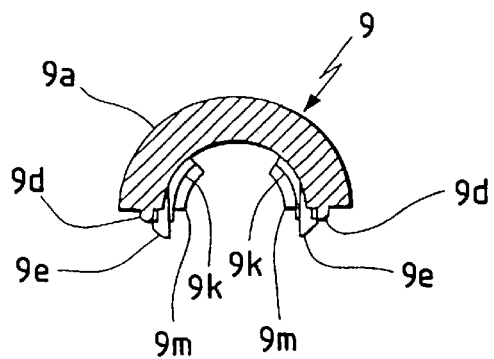
FIG. 18 is a sectional view of the second case taken along line 18—18 in FIG. 15 and viewed from the opposite end side.

Further, on the inner peripheral surface of the peripheral portion 9a and on the engaging portion 9b side of the columnar portion 9f there are formed such projections 9k of an arcuate cross section as shown in FIG. 18, and on the engaging portion 9b side of the projections 9k are formed projections 9s, 9m and 9n which are the same as the projections 9k and which are arranged at the same intervals as that of the projections 1s, 1m, 1n and 1o of the first case 1.

The second case 9 is mounted to the first case 1 by inserting the engaging portion 9b into the cylindrical portion 1b of the first case, allowing the projections 9d formed on both edges of the peripheral portion 9a to be opposed to the stepped portions 1d of the first case and hooking the hook-like projections 9e to the lugs 1f of the first case. In this mounted state, as shown in FIG. 20, the upper end of the columnar portion 1g is inserted into the bolt hole 9g, and the annular projection 2c of the urging member 2 is positioned between the projections 9k and 9s to restrict the movement of the urging member in the longitudinal direction of the second case 9 in cooperation with the projections 1s and 1m of the first case. The projections 9m and 9n are in abutment with the peripheral portion 4a of the retaining member 4. Further, the cutout 9r formed in the semicircular side wall 9c is in opposition to the cutout 1r formed in the side wall 1c of the first case 1, and the cable 21 drawn out of the first case 1 from the cutouts 1r and 9r are gripped and fixed by both cutouts 1r and 9r. Further, as shown in FIG. 20, the first and second cases 1 and 9 are fixed together with a bolt 10 in the bolt hole 9g and bolt slot 1h. The detector 6a formed by printing on the substrate 6 is positioned on the axis of the stylus pen constituted by the first and second cases 1, 9, and the substrate 6 is positioned at a distance approximately equal from the inner walls of both cases.

Under the above construction, since the circuit portion 5 is accommodated within the first and second cases 1, 9 in such a manner that the substrate 6 is positioned within such a width A, of the switch as shown in FIG. 23, it is not necessary that the space corresponding to the thickness B, of the substrate 14 be ensured in the diametrical direction of the first and second cases 1, 9. Moreover, since most of the electronic components (not shown) mounted on the substrate 14 are present within the width A, of the switch 7, it is possible to decrease the radial size of the first and second cases 1, 9 and hence possible to attain the reduction in size of the stylus pen.

The following description is now provided about the method of assembling the stylus pen according to the first embodiment of the present invention. First, the connector 6b is attached to the substrate 6 on which have been printed the detector 6a and predetermined patterns and to which have been soldered various electronic components, and thereafter the switch 7 is mounted at the rear end of the substrate 6. More specifically, the bottom 7c of the switch 7 and an edge portion of the substrate 6 are opposed to each other, preferably both are brought into abutment with each other, so that the pushing direction of the switch 7 and the substrate 6 are nearly parallel to each other. In this state, one terminal part 7b is soldered to one side of the substrate 6, while the other terminal part 7b, which has been bent in advance, is passed through the cutout 6c of the substrate 6 and is soldered to the other side of the substrate 6. In this way the substrate 6 is mounted in a sandwiched state in between both terminal parts. Next, the spring 3 is inserted into the annular space 2k of the urging member 2 and subsequently the hooks 4e and 4f of the retaining member 4 are inserted into the opening 2h of the urging member 2 so as to become opposed to the cutouts 2e and 2f of the urging member. In this case, first the hooks 4e and 4f strike against an edge 2m of the opening 2h. In this state, if the retaining member 4 is further pushed in, the hooks 4e and 4f bend inwards in the opening 2h by virtue of elasticity of the retaining member 4. When the tips of the hooks 4e and 4f have reached the cutouts 2e and 2f, both hooks revert to their original state and are hooked to the cutouts 2e and 2f, whereby the retaining member 4 is mounted to the urging member 2. At this time, the spring 3 is positioned and held between the inner wall of the end face portion 2b of the urging member 2 and the end face portion 4b of the retaining member 4, and both ends of the spring 3 are in a slightly compressed state by both inner wall of the end face portion 2b and outer wall of the end face portion 4b.

Next, the cap 8 is press-fitted on the front end portion of the substrate 6, then the cable 21 is connected to the connector 6b of the substrate 6 and is drawn out from the cutout 4c through the interior of the retaining member 4, then is conducted from the opening 2h of the urging member 2 into the interior thereof and is drawn out from the cutout 2g. Thereafter, the rear end portion of the substrate 6 is allowed to be guided by the guide grooves 4h of the retaining member 4 and part of the substrate 6 is inserted into the retaining member 4, whereupon part of the switch 7 strikes against the projection 4g of the retaining member. In this state, if the circuit portion 5 is further pushed in, the projection 4g bends outwards by virtue of elasticity of the retaining member 4 and reverts to its original state just before abutment of the switch 7 with the inner wall of the end face portion 4b of the retaining member 4, so that the bottom 7c of the switch 7 is retained by the projection 4g and thus the circuit portion 5 is mounted to the retaining member 4. Next, the thus-integrated body of urging member 2, spring 3, retaining member 4, circuit portion 5 and cap 8 is mounted in the first and second cases in the following manner. The cap 8 is inserted into the cylindrical portion 1b of the first case 1 and at the same time the urging member 2, retaining member 4 and circuit portion 5 are received in the first case 1 so that the annular projection 2c of the urging member 2 is positioned between the paired projections 1s and 1m of the first case 1. Further, the cable 21 which has been drawn out from the cutout 2g of the urging member 2 is wound once around the columnar portion 1g of the first case 1 and is drawn out to the exterior of the first case from the cutout 1r formed in the side wall 1c of the first case.

Thereafter, the second case 9 is put on the first case 1 so that its hook-like projections 9e are opposed to the lugs 1f of the first case, resulting in that the projections 9e strike against the lugs 1f. In this case, by pushing the second case 9 toward the first case 1, the projections 9e bend inwards. When the hook portions of the projections 9e have passed the lugs 1f, the projections 9e revert to their original state and are retained by the lugs 1f, whereby the second case 9 is secured to the first case 1. Then, the bolt 10 is inserted into the bolt hole 9g of the second case to bolt the second case to the first case.

In this way the assembly of the stylus pen is completed. After the assembly, the annular projection 2c of the urging member 2 is positioned between the projections 9k and 9s of the second case 9, the urging member 2 is fixed by the projections 1s and 1m of the first case 1, and the retaining member 4 is slidable in the longitudinal direction of the first and second cases 1, 9 together with the substrate 6 and cap 8 while being guided by the projections 1n, 1o of the first case 1 and the projections 9m, 9n of the second case 9. The projections 9h, 9i and 9j of the second case 9 are in abutment with the cable 21 wound around the columnar portion 1g of the first case 1 and press the cable, which cable is drawn out of the first and second cases 1, 19 while being sandwiched in between the cutouts 1r and 9r of both cases and is connected to the tablet.

The operation of the stylus pen according to the first embodiment of the present invention will now be described. The stylus pen assembled as above is connected to an electrostatic coupling type tablet through the cable 21 which has been drawn out of the cutouts 1r and 9r of the first and second cases 1, 9, the tablet being connected to a body provided with a display such as a computer or an electronic game machine. A plurality of signal lines which are electrostatically coupled with the detector 6a of the stylus pen are buried in the surface of the tablet in the form of a lattice and at predetermined intervals in X and Y axis directions. The signal lines are each controlled by a control means (not shown) disposed within the tablet so as to permit an alternating current to flow while making switchover between X and Y axis directions. When an alternating current is passed through a signal line closest to the detector 6a, there is obtained a maximum detection output from the detector 6a, so by checking through which signal line the alternating current was flowed when the detector 17 issued the maximum output, which check is made by a detection means, there is detected the position of the stylus pen on the tablet. The thus-detected position of the stylus pen is outputted in an instant to the body which is connected to the stylus pen. In performing an input operation by the use of such a tablet, the operator is required to hold the stylus pen and move it while allowing the cap 8 to come into contact with the upper surface of the tablet. With this movement, the tablet detects positions of the stylus pen continually and outputs detected signals to the body, which in turn makes control to move the cursor to positions on the display corresponding to the stylus pen positions on the tablet and make a display. At the time of selecting an option from a menu displayed on the display or at the time of inputting positional coordinates of the cursor on the display, the cursor is moved to a desired position on the display by using the stylus pen and the cap 8 is pushed onto the tablet. As a result, the cap 8 is pushed into the first and second cases 1, 9, and the substrate 6 with the cap 8 fitted thereon slides and pushes in the retaining member 4, so that the hooks 4e and 4f of the retaining member 4 are guided into the cutouts 2e and 2f of the urging member 2 while the retaining member 4 compresses the spring 3, and the peripheral portion 4a of the retaining member slides while being in sliding contact with and guided by the projections 1n, 1o, 9m and 9n formed in the first and second cases 1, 9. Then, when the operating part 7a of the switch 7 mounted to the substrate 6 is pushed against the urging portion 2i of the urging member 2, the switch 7 turns on, thereby permitting menu selection and the input of cursor position coordinates. By moving the stylus pen on the tablet while keeping the switch 7 on, that is, while keeping the cap 8 pushed against the upper surface of the tablet, at the of input of position coordinates, it is made possible to draw a graphic form such as a straight line in accordance with the inputted position coordinates. The menu selection and input of cursor position coordinates can be stopped in the following manner. Upon release of the cap 8 from the tablet, the retaining member 4 is pushed back under the restoring force of the spring 3, so that the substrate 6 and cap 8 return to their original positions, the operating part 7a of the switch 7 leaves the urging portion 2i and the switch 7 turns off. In this way it is possible to stop the menu selection and the input of cursor position coordinates.

In the first embodiment described above, the switch 7 is attached to the rear end portion of the substrate 6, as shown in FIG. 23, and in this state the circuit portion 5 is received in the first and second cases 1, 9, as shown in FIG. 20. Therefore, the operational direction of the operating part 7a of the switch 7 and the moving direction of the substrate 6 are nearly coincident with each other, and hence it is not necessary to use a cam mechanism for converting the moving direction of the substrate 6 into the operational direction of the operating part 7a to push the operating part, whereby the operation of the switch 7 can be repeated positively. As shown in FIG. 23, moreover, the substrate 6 is positioned within the width A, of the switch 7, so in the first and second cases 1 and 9 it is not necessary to ensure a space corresponding to the thickness B, of the substrate 6 in the diametrical direction of the cases, whereby it is made possible to decrease the radial size of the cases and attain the reduction in size of the stylus pen.

Moreover, as shown in FIG. 23, an edge portion of the substrate is opposed to the middle portion of the switch bottom, whereby the distance between the inner wall of the first case 1 and the substrate 6 and that between the second case inner wall and the substrate can be made almost equal to each other. Consequently, both cases can be further decreased in radial size and hence it is possible to attain a further reduction in size of the stylus pen.

The substrate 6 is retained by the retaining member 4 made of such a synthetic resin material as polyacetal which is superior in sliding performance to such an insulating synthetic resin material as ABS resin which is the material of the substrate and of the first and second cases 1, 9, and is partially guided by the projections 1n, 1o, 9m and 9n and is accommodated in both cases. Therefore, not only the substrate 6 can slide smoothly within both cases but also it is possible to suppress variations in the operating force required for operation of the switch.

Since the detector 6a for detecting a signal provided from the tablet is formed by printing integrally with a wiring pattern on the substrate 6, complex labor is not required for mounting the detector 6a on the substrate 6, whereby the improvement in assembling process and the reduction of product cost can be attained. Furthermore, forming the detector 6a on the substrate always in the same state by printing makes it possible to reduce the fluctuation in the detecting performance of the detector 17.

In the switch 7, as shown in FIG. 23, one terminal part 7b is soldered to one side of the substrate 6, while the other terminal part 7b is bent and is passed through the cutout 6c of the substrate 6 and soldered to the other side of the substrate 6, whereby the switch 7 is mounted to the rear end portion of the substrate in a sandwiched state of the substrate by the terminal parts 7b. Thus, the switch 7 can be mounted to the substrate 6 in such a state that its bottom 7c and an edge portion of the substrate are in abutment with or adjacent to each other nearly perpendicularly. That is, at the time when the operating part 7a of the switch 7 is pushed by the urging portion 2i of the urging member 2, the force which the switch 7 receives from the substrate 6 can be borne by the bottom 7c, so that there is no fear of a load being imposed on the soldered areas of the terminal parts 7b which would cause peeling off of the solder, and the operation of the circuit portion 5 composed of the substrate 6 and the switch 7 can be maintained over a long time.

The substrate 6 is inserted into the retaining member 4 while being fitted in the guide grooves 4h of the retaining member, and the switch 7 is mounted by being engaged with the projection 4g, so the bottom 7c of the switch is in abutment with the projection 4g, and when the operating part 7a of the switch 7 is pushed by the urging portion 2i of the urging member 2, the operating part 7a can always be brought into pressure contact with the urging portion 2i while preserving the mounted posture of the switch 7 to the substrate 6, and thus it is possible to attain a stable switching operation.

Since the switch 7 is retained by the projection 4g of the retaining member 4, even if the cap 8 is pulled, the dislodgement of the substrate 6 is prevented by engagement of the bottom 7c of the switch with the projection 4g, whereby the circuit portion 5 comprising the substrate 6 and the switch 7 can be held within the first and second cases 1, 9.

The end face portion 4b of the retaining member 4 comes into abutment with an edge of the peripheral portion 2a of the urging member 2 upon turning on of the switch 7, so when the cap 8 is pushed strongly, there is no fear of the operating part 7a of the switch 7 being pushed in to a greater extent than necessary and hence there is no fear of destruction of the switch 7, whereby the switching operation can be kept stable over a long time.

Moreover, since the urging member 2 and the retaining member 4 are mounted by engagement the hooks 4e, 4f with the cutouts 2e, 2f, there is no fear of separation of the two under the biasing force of the spring 3, whereby the assembling work efficiency can be improved.

Further, the sliding motion of the substrate 6 is effected by sliding contact of the cap 8 and retaining member 4 both formed of a highly slidable material with the first and second cases 1, 9, without sliding contact of the substrate 6 with both cases, so the substrate 6 can slide smoothly. Besides, at the portion with which the substrate 6 might come into contact, there is provided the semi-spherical protuberance 1p to bear the substrate at one point, so that the frictional force resulting from such contact can be minimized to prevent a large increase in the operating force of the switch 7.

Further, since the detector 6a formed by printing on the substrate 6 is positioned on the axis of the stylus pen composed of the first and second cases 1, 9, the position on the tablet indicated with the stylus pen by the operator and the position detected by the detector 6a can be rendered approximately coincident with each other, and thus the operator can operate the stylus pen without feeling any sense of incongruity caused by a deviation between the said positions.

In the above first embodiment the central portion of the bottom 7c of the switch 7 and an edge portion of the substrate 6 are opposed to each other, but in FIG. 23 both may be opposed to each other within the width A, of the switch 7. In this case, the connector 6b and electronic components (not shown) protrude from the switch width A, but it is possible to reduce the radial size of the first and second cases 1, 9 by an amount at least corresponding to the overlapped portion of the widths A and B, namely the thickness B of the substrate, and thereby attain the reduction in size of the stylus pen.

Figure 24:
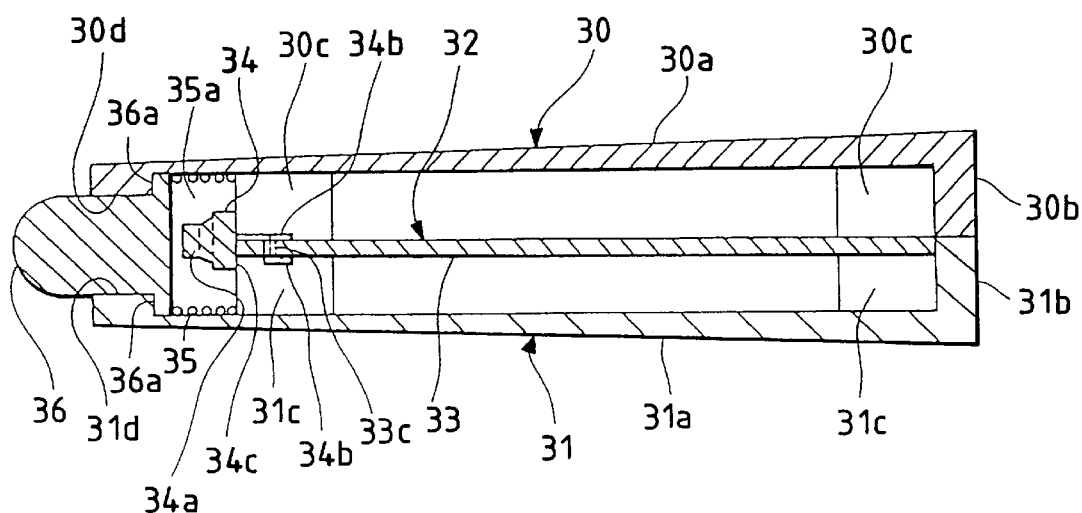
FIG. 24 is a longitudinal sectional view of a stylus pen according to a second embodiment of the present invention.
Figure 25:
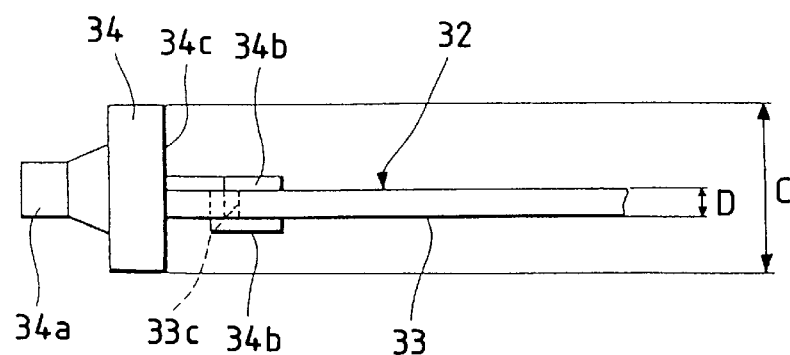
FIG. 25 is a side view of a principal portion of a circuit portion shown in FIG. 24.
Figure 26:
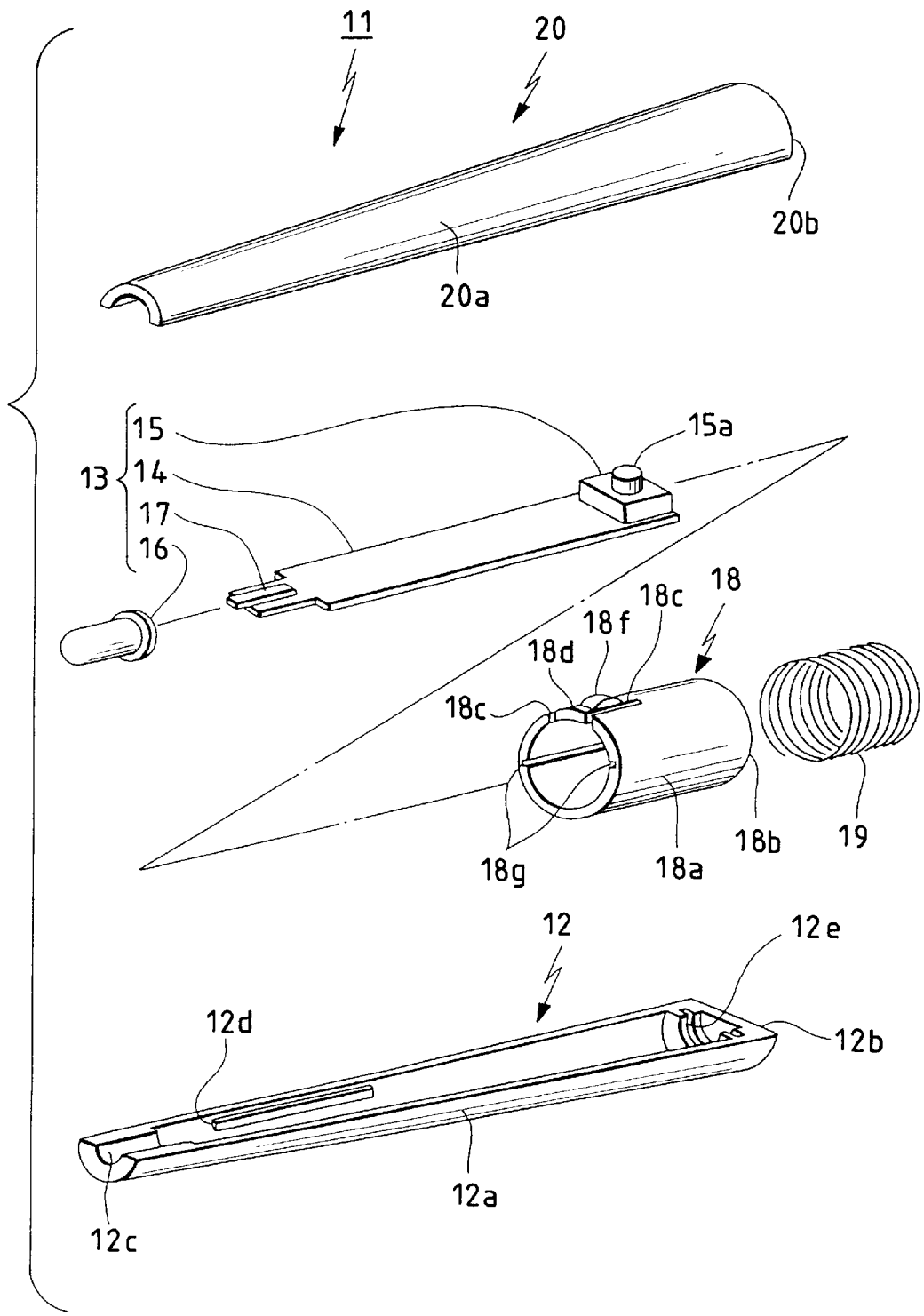
FIG. 26 is an exploded perspective view of a conventional stylus pen.
Figure 27:
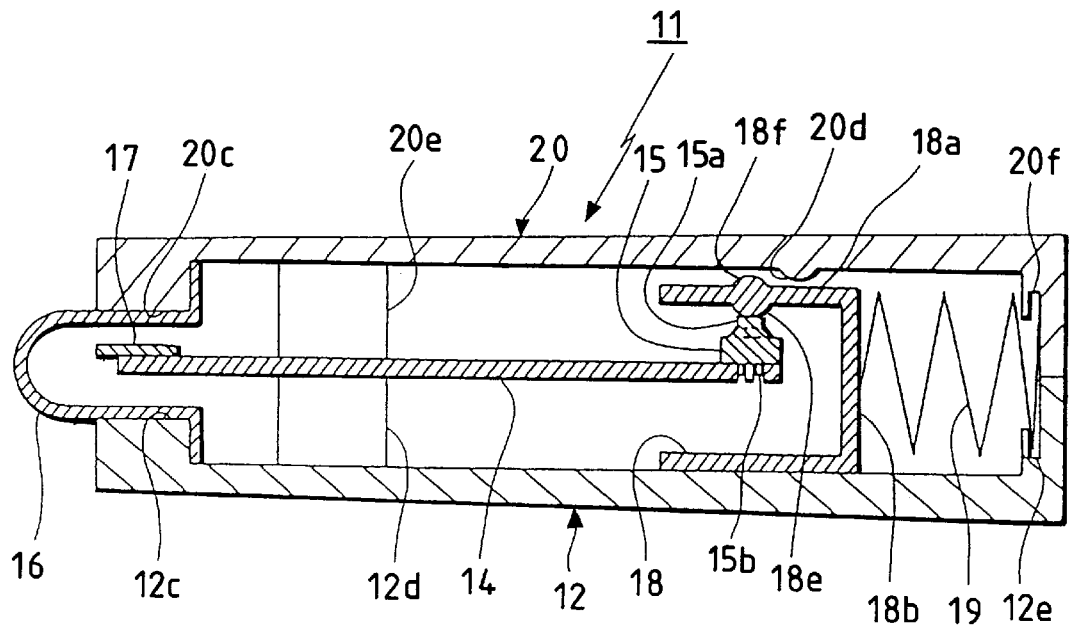
FIG. 27 is a longitudinal sectional view of the conventional stylus pen.
Figure 28:
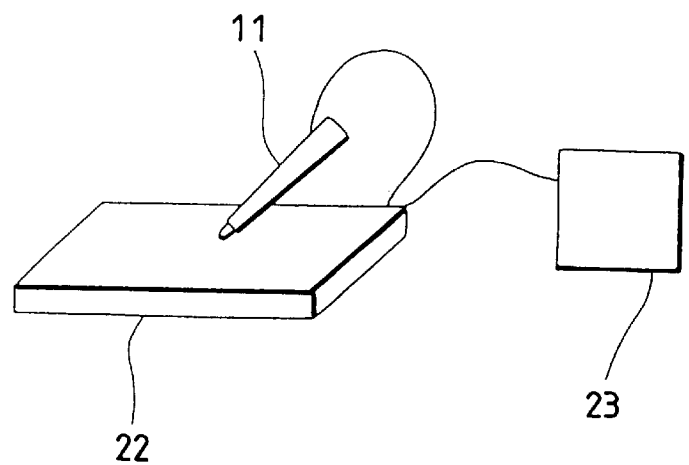
FIG. 28 is a view illustrating operating state of the stylus pen.

A stylus pen according to the second embodiment of the present invention will be described below with reference to FIGS. 24 and 25, which stylus pen is to be used for a tablet of a type other than the electrostatic coupling type, for example a resistor type tablet.

The stylus pen of the second embodiment substantially comprises first and second cases 30, 31, a circuit portion 32, a spring 35 and an urging member 36 which serves also as a pen point.

Like the first and second cases 1, 9 shown in the first embodiment, the first and second cases 30, 31 used in this second embodiment, which are formed of such an insulating material as ABS resin, are respectively provided with peripheral portions 30a, 31a having semi-arcuate inner and outer peripheral surfaces and also provided with semicircular side walls 30b, 31bformed at one ends of the peripheral portions 30a, 31a. The peripheral portions 30a and 31a are formed so as to become smaller in diameter gradually from one ends thereof where the side walls 30a, 31a are located toward the opposite ends. On the inner walls of the peripheral portions 30a and 31a are formed a pair of receptacle portions 30c and 31c for receiving therein a substrate 33 which will be described later, and are also formed semi-arcuate receptacle portions 30d and 31d having a diameter smaller than the inside diameter of the peripheral portions 30a and 31a. The first and second cases 30, 31 are combined in such a manner that the paired receptacle portions 30c and 31c are opposed to each other and so are the semi-arcuate receptacle portions 30d and 31d.

The circuit portion 32 comprises a substrate 33 which is a printed circuit board of a generally rectangular shape in plan and which is formed of paper phenol resin for example, and a push-button switch 34 of the same structure as that of the switch 7 shown in the first embodiment. On both sides of the substrate are mounted electronic components (not shown) to constitute an electronic circuit, and in one end portion of the substrate is formed a cutout 33c which is the same as in the first embodiment. The switch 34 has an operating part 34a and two terminal parts 34b. As in the first embodiment, a middle portion of a bottom 34c of the switch 34 is opposed to an edge portion of the substrate 33, preferably both are brought into abutment with each other, and one terminal part 34b of the switch 34 is soldered to one side of the substrate 33, while the other terminal part 34b is bent and soldered to the other side of the substrate 33 through the cutout 33c formed in the substrate. Thus, the switch 34 is mounted to one end portion of the substrate 33 while sandwiching the substrate in between the terminal parts 34b. As shown in FIG. 25, the substrate 33 is positioned within the width C of the switch 34, and the pushing operation direction of the operating part 34a of the switch 34 is approximately parallel to the longitudinal direction of the substrate 33. Within the width C of the switch 34 are positioned most of electronic components (not shown) which are mounted on the substrate 33. Further, a cable (not shown) connected to the electronic circuit is attached to the substrate 33.

Both longitudinal edges of the substrate 14 are held grippingly by the paired receptacle portions 30c and 31c of the first and second cases 30, 31, whereby the circuit portion 32 is fixed and accommodated within both cases. In this state, the bottom 34c of the switch 34 is in abutment with the paired receptacle portions 30c and 31c. Though not shown, the cable connected to the electronic circuit on the substrate 33 is drawn out of the first case 30 through a through hole formed in the peripheral portion 30a of the first case The spring 35, which is of a spiral shape and formed of a metallic spring material, has the same structure as that of the spring 3 used in the first embodiment and is centrally provided with a cylindrical space 35a. As shown in FIG. 24, the spring 35 is accommodated within the first and second cases 30, 31 so as to be positioned between the receptacle portions 30c, 31c on the semi-arcuate receptacle portions 30d, 31d side and the receptacle portions 30d, 31d. One end of the spring 35 is in abutment with the receptacle portions 30c and 31c, and the switch 34 is positioned within the cylindrical space 35a.

The urging member 36 is of a columnar shape and is formed of a synthetic resin material such as polyacetal superior in sliding performance to paper phenol resin and ABS resin. One end of the urging member is formed in a semi-spherical shape, while at the opposite end thereof is formed a flange portion 36a throughout the whole circumference of the opposite end. As shown in FIG. 24, the urging member 36 is received within the first and second cases 30, 31 so that its one end of a semi-spherical shape is projecting out of both cases and so that the urging member can slide while being sandwiched in between the receptacle portions 30d and 31d. Its flange portion 36a is in abutment with the other end of the spring 35 and also with the receptacle portions 30d, 31d.

The operation of the stylus pen according to this second embodiment of the present invention will now be described. The stylus pen constructed as above is connected to a tablet of a type other than the electrostatic coupling type, for example a resistor type, through a cable (not shown) drawn out from a through hole (not shown) formed in the first case 30. An input operation is performed by pushing the urging member 36 onto the tablet, whereupon the urging member slides through the first and second cases 30, 31 while being guided by the receptacle portions 30d, 31d and compressing the the spring 35, resulting in that the opposite end of the urging member 36 comes into abutment with the operating part 34a of the switch 34. In this state, by further pressing the urging member 36 onto the tablet, the urging member slides and pushes the operating part 34a of the switch 34, whereby the switch is turned on. As the stylus pen is moved on the tablet in this state, this movement is detected by the tablet as a positional change on the tablet of the stylus pen.

The inputting operation is stopped in the following manner. Upon release of the urging member 36 from its contact with the supper surface of the tablet, the urging member slides and reverts to its original state by virtue of the restoring force of the spring 35. Thus, the urging member 36 goes away from the operating part 34a of the switch 34 to turn off the switch and the resulting signal is transmitted to the tablet.

In the second embodiment described above there can be attained the following effects in addition to the effects mentioned in connection with the first embodiment. The bottom 34c of the switch 34 is in abutment with the first and second cases 30, 31, and when the operating part 34a of the switch 34 is pushed by the urging member 36, the pressure contact of the two is ensured while the switch 34 preserves its mounted posture to the substrate 33, whereby there can be attained a stable switching operation.

Moreover, the flange portion 36a of the urging member 36 is in abutment with the receptacle portions 30d and 31d of the first and second cases 30, 31, so even if the urging member is pulled, dislodgement of the urging member from both cases is prevented by the engagement of the flange portion 36a with the receptacle portions 30d and 31d. Thus, the urging member 36 can be held within the first and second cases 30, 31 at all times.

Although in the above second embodiment the circuit portion 32 is fixed within the first and second cases 30, 31, there is made no limitation thereto, but there may be adopted a construction wherein the circuit portion 32 can move slightly in the urging direction of the urging member 36 to equip the circuit portion with a damper function.

What is claimed is:

1. A stylus pen comprising:
   a case;
   a push-button switch and a substrate both accommodated within said case; and
   an urging member accommodated movably within said case,
   wherein said switch is mounted to said substrate so that a bottom portion of the switch and an edge portion of the substrate are opposed to each other,
   wherein an operating direction of said switch and a moving direction of said urging member are approximately coincident with each other,
   wherein said substrate is disposed within said case so that said switch and said urging member are opposed to each other,
   wherein said switch is operated by the movement of said urging member within said case,
   wherein said substrate includes parallel top and bottom surfaces joined by said edge portion, said top surface being parallel to said moving direction of said substrate and defining a plane,
   wherein said bottom portion of said switch has a width (A) extending in a direction perpendicular to the plane defined by the top surface of the substrate,
   wherein a distance between said top surface and said bottom surface at said edge portion is smaller than said width (A) of said bottom portion of said switch, and
   wherein said stylus pen further comprises electronic components mounted on at least one of said top and bottom surfaces of said substrate, said electronic components having outermost surfaces which are disposed within the width (A) of said bottom portion of said switch.

2. A stylus pen including:
   a case;
   a push-button switch accommodated within said case; and
   a substrate accommodated within said case so as to be movable in the longitudinal direction of the case, wherein
   an operating direction of said switch and the moving direction of said substrate are made approximately coincident with each other;
   said switch is mounted to said substrate so that a bottom portion of the switch and an edge portion of the substrate are opposed to each other;
   said switch is operated by moving said substrate within said case;
   said substrate includes parallel top and bottom surfaces joined by said edge portion, said top surface being parallel to said moving direction of said substrate and defining a plane;
   said bottom portion of said switch has a width (A) extending in a direction perpendicular to the plane defined by the top surface of the substrate;
   a distance between said top surface and said bottom surface at said edge portion is smaller than said width (A) of said bottom portion of said switch; and
   said stylus pen further comprises electronic components mounted on at least one of said top and bottom surfaces of said substrate, said electronic components having outermost surfaces which are disposed within the width (A) of said bottom portion of said switch.

3. A stylus pen according to claim 2, wherein the edge portion of said substrate is opposed to a middle position of the bottom portion of said switch.

4. A stylus pen according to claim 2, wherein a detector for detecting a signal provided from a tablet is formed by printing on said substrate.

5. A stylus pen according to claim 2, further comprising:
   an urging member fixed within said case and located adjacent said push-button switch; and
   a retaining member mounted to said substrate and slidably engaged with said urging member such that said push-button switch is guided toward said urging member in said moving direction of said substrate;
   wherein movement of said substrate over a predetermined distance in said moving direction causes said push-button switch to press against said urging member, thereby actuating said push-button switch.

6. A stylus pen according to claim 5, wherein:
   said urging member defines a pair of cutouts; and
   said retaining member includes a pair of hooks engaged in said cutouts.

7. A stylus pen according to claim 6, further comprising a spring, interposed between said urging member and said retaining member, for biasing said retaining member away from said urging member.

8. A stylus pen comprising:
   a case;
   a push-button switch accommodated within said case; and
   a substrate accommodated within said case so as to be movable in the longitudinal direction of the case,
   wherein an operating direction of said switch and the moving direction of said substrate are made approximately coincident with each other, said switch is mounted to said substrate so that a bottom portion of the switch and an edge portion of the substrate are opposed to each other, and said switch is operated by moving said substrate within said case when the stylus pen is pressed against an operating surface,
   wherein the operating surface is an electrostatic tablet comprising:
   a plurality of first signal lines in parallel in the surface of the tablet, the first signal lines for passing electrical current therethrough for detection by a sensor on said substrate; and
   a plurality of second signal lines perpendicular to the first signal lines in the surface of the tablet, the first signal lines for passing electrical current therethrough for detection by the sensor on said substrate.

9. A stylus pen according to claim 8 incorporated into a computer system, the computer system including the stylus pen and the operating surface.

* * * * *